Patented Dec. 19, 1944 2,365,346

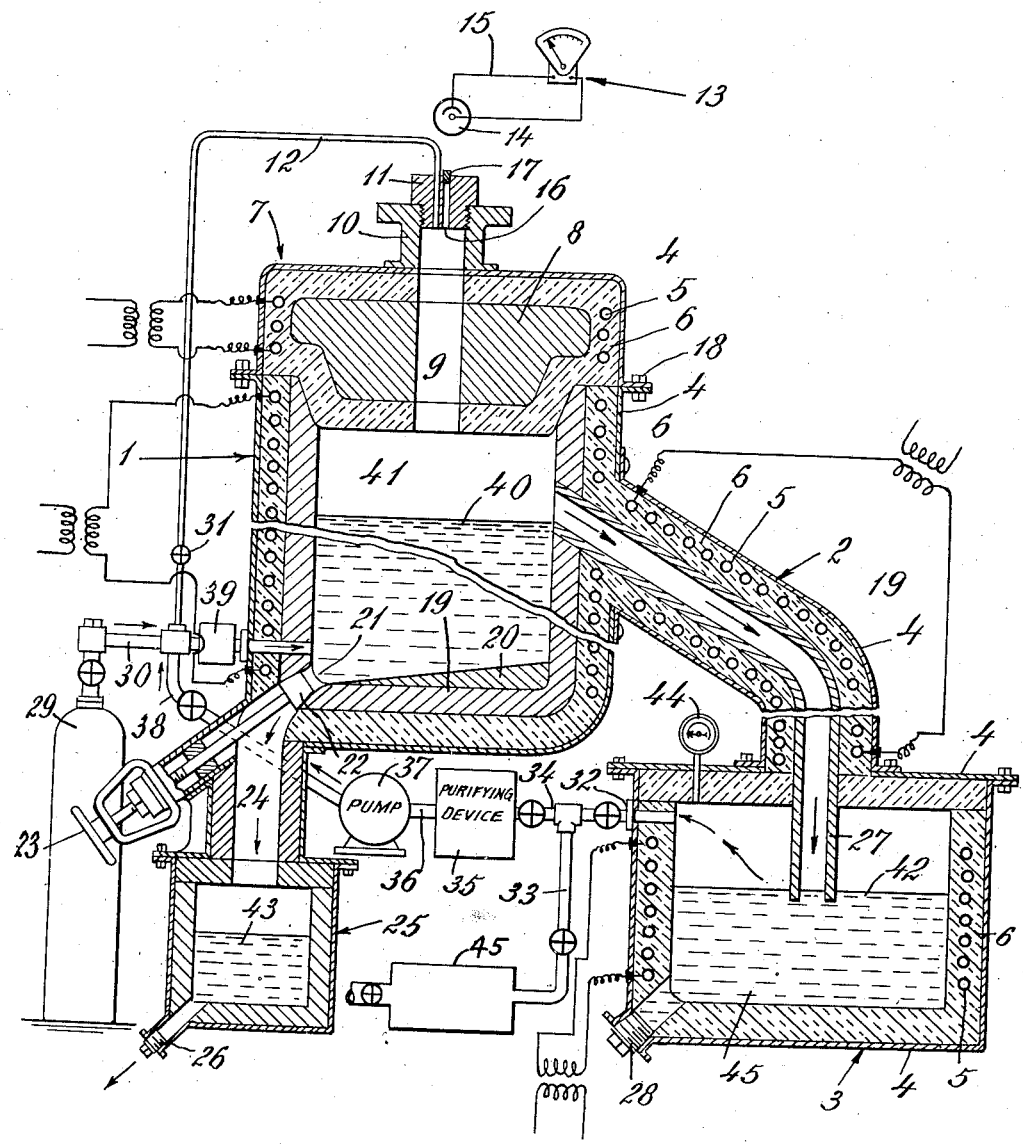

UNITED STATES PATENT OFFICE 2,365,346

APPARATUS FOR MANUFACTURING METALS

Osias Kruh, Brooklyn, N. Y.

Original application October 6, 1939, Serial No. 298,189, now Patent No. 2,255,549, dated September 9, 1941. Divided and this application September 9, 1941, Serial No. 410,203

3 Claims. (Cl. 266—15)

This invention relates to apparatus for the metallurgy of metals such as aluminum, beryllium, chromium, magnesium and the like, as well as to their alloys, and has for its object certain improvements in the apparatus for recovering such metals and production of their alloys, as well as certain valuable by-products produced during the practice of the invention.

In accordance with the invention the apparatus comprises a reduction chamber, a gas inlet for passing an inert gas into the reduction chamber, an upper outlet above the normal charge level of the reduction chamber for the escape of volatilized metal vapor and gaseous products, a lower outlet in the lower portion of the reduction chamber for the removal of residues, a receptacle at the discharge end of the lower outlet for receiving the residues from the reduction chamber, means associated with the lower outlet for opening and closing the same to permit intermittent discharge of the residues from the reduction chamber to the receptacle, high frequency induction means associated with the reduction chamber to heat the same to a highly elevated temperature, a condenser, a vapor conduit connecting the upper part of the reduction chamber with the upper part of the condenser, high frequency induction means associated with the condenser to heat the same, a valved gas conduit connecting the upper part of the condenser with the reduction chamber, said valved gas conduit being provided with a pump to circulate gas from the condenser to the reduction chamber, and means for bleeding off gaseous products of reduction from the system.

In the accompanying drawing, I have illustrated diagrammatically an apparatus illustrative of a practice of the invention. Briefly, the apparatus consists of an induction furnace 1, a conduit 2, and a condenser 3 appropriately connecting one another. Each unit is covered by a metal casing 4, and is also provided with a separate series of current and water-carrying copper tubes 5 embedded in an appropriate layer of insulating material 6, such as beryllium oxide adapted to withstand very high temperatures. Each series of tubes 5 is connected to a transformer and a source of electrical current, so that each unit may be heated by induction.

Referring to the specific construction of the reduction furnace, it will be seen that it is provided with a removable top 7, the core 8 consisting of material, such as tungsten, adapted to withstand high temperatures. A passageway 9 extends centrally through the top, and connects with the passageway of a connecting member 10 secured to the furnace top, into which a fixed plug 11 is screwed. A conduit 12, with a valve 31, of small diameter extends through the plug for the introduction of a stream of inert gas adapted to sweep the conduit 9 substantially clear of products of reduction which tend to accumulate therein.

A temperature indicating device 13 is associated with the top of the reduction chamber, and advantageously consists of a photo-electric bulb 14 and a pair of leads 15 connecting the bulb with the temperature indicator; the bulb being located directly over a passageway 16 extending through the plug 11, in alignment with the passageway 9. The passageway 16 is provided with a suitable quartz window 17 adapted to let light pass from the reduction furnace to the bulb 14. The top may be removed from and non-leakably secured to the main reaction chamber by the use of removable bolts 18.

The reduction chamber is provided at its sides and bottom with a graphite lining 19, the bottom portion 20, also of graphite, being inclined, as shown, in order to cause its contents to flow toward and into an opening 21 at the bottom of the chamber. The opening is in turn provided with a removable plug 22 suitably attached to a plug-inserting and removing means 23 of conventional construction.

The opening 21 communicates with a suitably insulated passageway 24 leading into a heat insulated receptacle 25 adapted to receive liquefied products of reduction from the reaction chamber, such as ferro-silicon and the like. This receptacle is provided with a removable plug arrangement 26, similar to the one above described. Non-leakable joints are provided so that pressures may be built up in the system.

The conduit 2 is also provided with a graphite lining and extends from near the top of the reduction chamber to the top of the condenser, as shown. An extension conduit 27 runs from the end of conduit 2 well into the interior of the condenser 3.

The condenser is designed to contain a fused bath of salt or mixture of salts inert to the metals to be recovered, the bath to be maintained at a level that is just above the lower end of the extension conduit 27. The condenser is provided with a removable plug 28 similar in construction to those described above.

As is shown by the drawing, the above-described apparatus is suitably equipped with conduits and means for supplying a continuous stream of inert gas, such as hydrogen or argon, successively through the reduction chamber, the conduit and the condenser. The drawing shows a conventional metal container or bottle 29 adapted to contain a supply of the inert gas. A conduit 30 connects the outlet of the bottle with the lower portion of the reduction chamber, and is also provided with an outlet adapted to connect with the conduit 12 provided in the plug 11 of the reduction furnace.

A valved conduit 32 extends from the upper portion of the condenser, and connects with a valved outlet 33 for the removal of undesirable carbon monoxide and other gaseous reaction products from the system. This conduit advantageously connects with suitable receptacles for the collection and treatment of the carbon monoxide.

Another conduit 34 connects with a purifying device 35, a conduit 36, a pump 37, a valved conduit 38, which in turn connects with conduit 30 leading through a preheater 39 into the reduction chamber. Said purifying device is adapted to remove such gases as nitrogen, oxygen and moisture. Suitable chemicals for this purpose are molten aluminum, magnesium and other similarly reacting metals.

From what has been said above, the operation of the apparatus in the practice of the process of the invention will be quite clear. A charge 40 of the ore of the metal to be treated in oxide form, and an appropriate amount of carbonaceous reducing agent, such as coke, is introduced in the reduction chamber 41. The top 7 may be removed for the introduction of the charge, or the charge may be passed through the passageway 9 on removing the connecting member 10 or the plug 11. In order to remove silica from the charge, an appropriate amount of iron filings are admixed with the ore and carbon. The iron combines with the silica to form a ferro-silicon alloy with the aid of the carbon. The iron also acts as a conductor for induced electric current and thus facilitates heating of the charge.

In order to condense the metal vapor to be produced, a suitable salt or mixture of salts 42 is placed in condenser 3, in amount sufficient to provide a fused bath of the salt at the level of or slightly above the lower end of extension conduit 27.

The entire system is heated by passing suitable electrical current through copper tubes 5, and the tubes are cooled by passing water therethrough, in a manner known to the art. As the charge reaches its reduction temperature, carbon monoxide is formed, and perhaps some other reaction gases. The charge is maintained under a predetermined and sufficiently high pressure to retain the reduced metal within the reduction zone until the reaction has gone to substantial completion.

In a modification of the process, particularly for the production of such metals as aluminum, beryllium, or their alloys, and chromium, the oxide of the metal to be treated is heated in the presence of a sufficient amount of the carbonaceous reducing agent to form a carbide of the metal, the charge being maintained at a predetermined pressure and temperature to assure the formation of a carbide of the metal, and its retention as such; so that the metal carbide is not decomposed or vaporized at that temperature and pressure.

As the reaction continues in the reduction chamber, a by-product 43, such as ferro-silicon, is formed, which collects at the bottom of the chamber. This is tapped by means of the withdrawal of plug 22, when the ferro-silicon runs into and is deposited within receptacle 25. During this operation, the system is maintained under appropriate pressure, as will be shown by the pressure indicating device 44.

An inert gas, such as hydrogen or argon, contained in metal bottle 29 is then fed through conduit 30 and the preheater 39 into the reduction chamber 41, at a temperature and pressure equal to that maintained within the chamber. A sufficient amount of the inert gas is thus introduced to sweep out carbon monoxide still left in the system. For this purpose, the inert gas passes in, through, and over the charge into the free space above the charge, thence through conduit 2 into the condenser 3, from which it passes through conduits 32 and 33 to the open atmosphere or preferably to a holder or container 45 for subsequent treatment to recover or utilize the valuable carbon monoxide.

After the carbon monoxide has thus been removed from the system, the valve in conduit 33 is closed, pump 37 is put in operation, and a continuous stream of inert gas from bottle 29 is passed successively through reduction chamber 41, conduit 2 and condenser 3. The inert gas leaving the condenser is passed through the purifying device 35, in which oxygen, nitrogen and moisture are removed. A certain amount of the gas is by-passed through conduit 31, and passed into and downwardly through the passageway 9 in order to sweep the passageway clear of products of reduction that would otherwise tend to collect therein.

The temperature of the reduced metal in the reduction chamber is then raised to its boiling point while still maintaining the system under pressure. In the case of the metal carbide, the temperature is raised until the carbide is decomposed, and metal vapor is evolved. In either case, the resulting metal vapor is passed in the presence of the inert gas from the reduction chamber through the conduit to the condenser 3, in which the metal vapor is condensed. Due to the fact that the specific gravity of the fused molten salt in the condenser is lower than that of the metal to be recovered, the condensed metal particles coalesce and merge into a liquid that settles out at the bottom in the form of a layer 46, which may be tapped as desired.

After the charge in the reduction chamber has been treated in the manner indicated, a new charge is introduced. If, during the production of metal from the previous charge, the metal was converted to a carbide, the decomposition results in the release of carbon or graphite particles that are permitted to remain in the reduction chamber and to become a part of the carbonaceous reducing agent used to treat the newly introduced charge of ore.

It will be clear to those skilled in this art that a great saving of heat can be effected by circulating the inert gas from the condenser to the reduction chamber. As the gas leaves the condenser it is highly heated by the heat given up by the metal vapors as they condense. To prevent substantial heat loss, the gas carrying conduit, and its intermediate devices, are well insulated.

This application is a division of my co-pending application Serial No. 298,189, filed October 6, 1939, which issued September 9, 1941, as Patent 2,255,549, and which claims and describes in greater detail the operation of the apparatus in the practice of the process of my invention.

I claim:

1. In apparatus for the recovery of metals, the improvement comprising a reduction chamber, a gas inlet for passing an inert gas into the reduction chamber, an upper outlet above the normal charge level of the reduction chamber for the escape of volatilized metal vapor and gaseous products, a lower outlet in the lower portion of the reduction chamber for the removal of residues, a receptacle at the discharge end of the lower outlet for receiving the residues from the reduction chamber, means associated with the lower outlet for opening and closing the same to permit intermittent discharge of the residues from the reduction chamber to the receptacle, high frequency induction means associated with the reduction chamber to heat the same to a highly elevated temperature, a condenser, a vapor conduit connecting the upper part of the reduction chamber with the upper part of the condenser, high frequency induction means associated with the condenser to heat the same, a valved gas conduit connecting the upper part of the condenser with the reduction chamber, said valved gas conduit being provided with a pump to circulate gas from the condenser to the reduction chamber, and means for bleeding off gaseous products of reduction from the system.

2. Apparatus according to claim 1, in which the condenser is provided with a gas purifying device and a gas preheater.

3. Apparatus according to claim 1, in which the condenser is adapted to contain a fused bath of salt or mixture of salts and is provided with a depending extension conduit connecting said vapor conduit, the extension conduit depending into the condenser a substantial distance so that the lower end of the extension conduit may be immersed in the fused bath of salt or mixture of salts floating on the top of a bath of condensed molten metal collected in the condenser.

OSIAS KRUH.